Figure 1:
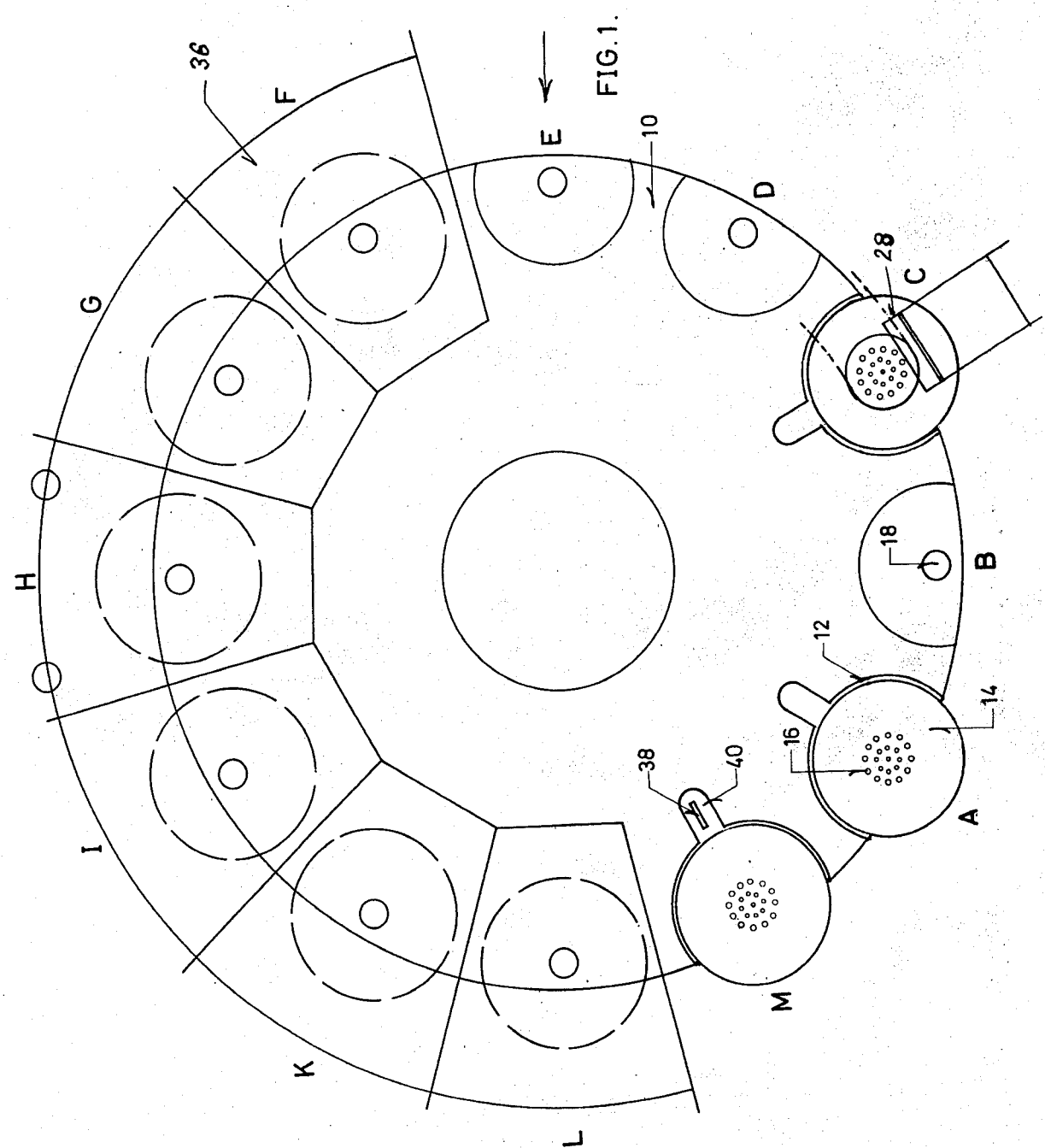

United States Patent [19]

Buus et al.

[11] 4,401,889
[45] Aug. 30, 1983

[54] METHOD AND APPARATUS FOR MEASURING THE INTENSITY OF PREFERABLY GAMMA RADIATION OF RADIATION ACTIVE DEPOSIT CONTAINED WITHIN A LIQUID SAMPLE

[75] Inventors: Ole Buus, Birkerød; Michael J. Nielsen, Frederiksberg, both of Denmark

[73] Assignee: Medi-Lab, Medicinsk Laboratorium A/S, Denmark

[21] Appl. No.: 249,119

[22] Filed: Mar. 30, 1981

Related U.S. Application Data

[63] Continuation of Ser. No. 54,174, Jul. 2, 1979.

[30] Foreign Application Priority Data

Jul. 12, 1978 [DK] Denmark .............................. 3139/78

[51] Int. Cl.³ ........................ G01T 1/00; G01N 21/00
[52] U.S. Cl. ....................................... 250/328; 422/64
[58] Field of Search ....................... 250/303, 367, 328; 422/64

[56] References Cited

U.S. PATENT DOCUMENTS

| | | | |
|---|---|---|---|
| 2,717,693 | 9/1955 | Holmes | 250/303 |
| 3,540,858 | 11/1970 | Rochte et al. | 422/64 |
| 3,567,393 | 3/1971 | Welch | 422/64 |
| 3,923,463 | 12/1975 | Bagshawe et al. | 250/328 |
| 4,035,642 | 7/1977 | Johnson et al. | 250/328 |
| 4,211,747 | 7/1980 | Gross | 250/328 |
| 4,267,451 | 5/1981 | Berick | 250/367 |

FOREIGN PATENT DOCUMENTS

| | | |
|---|---|---|
| 1204603 | 1/1960 | France . |
| 1321571 | 2/1963 | France . |
| 1484728 | 6/1967 | France . |

*Primary Examiner*—Alfred E. Smith
*Assistant Examiner*—Janice A. Howell
*Attorney, Agent, or Firm*—Pennie & Edmonds

[57] ABSTRACT

A method and an apparatus for isolating and measuring the intensity of gamma radiation or other type of radioactive radiation from a radiation active deposit contained within a liquid sample, in which the measurement is performed in step with a previous isolation of a sample by an intermittent advance (10) of the sample from an isolation station to a measuring station. The measurement is made in step with the intermittent advance of the sample in a plurality of immediately succeeding partial measurements in a measuring unit which comprises a plurality of successively arranged radiation detectors (36) corresponding to a predetermined number of partial measurements. Each partial measurement constitutes a part of the total measurement of the same corresponding to the step of advance. The measuring results from the individual partial measurements of the sample are summed up (60), and the sum is registered. The sample may be deposited on disc-shaped membrane filter carriers.

8 Claims, 7 Drawing Figures

METHOD AND APPARATUS FOR MEASURING THE INTENSITY OF PREFERABLY GAMMA RADIATION OF RADIATION ACTIVE DEPOSIT CONTAINED WITHIN A LIQUID SAMPLE

This is a continuation of application Ser. No. 054,174, filed July 2, 1979.

The invention relates to a method for isolating and measuring the intensity of gamma radiation or other type of radioactive radiation from a radiation active deposit contained within a liquid sample, the measurement being performed in step with a previous isolation of a sample by an intermittent advance of the sample from an isolation station to a measuring station.

The measuring process is carried out in the way that the radiation active deposit contained in the liquid sample is isolated on a filter material by means of a filtration, whereafter the radiation intensity of the deposit is measured.

Such measurements are e.g. made in connection with medical-analytical purposes, but are also used industrially. In practice, a considerable number of samples is usually examined successively.

With this end in view one has previously proceeded in the manner that the individual samples are treated in succession each per se in such a manner that their radiation active deposit is isolated on a pre-manufactured strip-formed film roller with filter areas glued thereto through which the sample is filtered. The sample areas were hereafter covered with tape in order to prevent set-off, when the film is rolled up for the later measurement. When all samples are filtered, the film roller is transferred to a measuring apparatus which now starts a measurement of the samples, one sample at a time, in a single set of detectors. It is also known in principle for transportation of the samples to use a turn table.

A finished measurement per sample lasts e.g. two minutes, while a filtration only takes about 20 seconds. The measurement can only be accelerated by reducing this time which would influence the accuracy of the measurement.

The object of the invention is to provide a substantial acceleration of the measuring process so that the total time to perform a measurement for a great number of samples can be reduced considerably.

This object is according to the invention obtained by making the measurement in step with the intermittent advance of the sample in a plurality of immediately succeeding partial measurements each constituting a part of the total measurement corresponding to the step of advance, summing the measuring results from the individual partial measurements and registering the sum.

In other words the invention is due to the recognition that it is not necessary to perform a finished measurement for one sample at a time, but that the measuring process can be divided into a plurality of immediately succeeding steps and that the measurement of a plurality of samples can be performed simultaneously with each sample being at its own step. For instance the measurement can be carried out in six steps of 20 seconds each, so that six samples are treated simultaneously. Hereby the measuring work can be brought in a rhythm which substantially corresponds to the rhythm by an effected filtration without affecting the measurement accuracy.

The invention relates also to an apparatus for carrying out the method. The apparatus being of the type which has a conveyor device for deposits on a filter, a filtering unit and a measuring unit for measuring the intensity of gamma radiation or other type of radioactive radiation, the conveyor device containing means for intermittent advance of a plurality of individual deposit samples past the filtering unit and thereafter past the measuring unit, and the apparatus is according to the invention characterized by the measuring unit comprising a plurality of radiation detectors corresponding to a predetermined number of partial measurements, said detectors being beside each other successively arranged opposite to the advance path of the samples and connected with a summing and registration apparatus for the measuring results of the detectors.

In other words the apparatus is adapted for intermittent treatment of deposits in such a manner that the individual samples are advanced from station to station during the measurement process for carrying out an accurate total measurement of the radiation intensity of the isolated active substances. According to the invention the conveyor device can comprise a number of filter carriers, each for a membrane filter, and each filter carrier can preferably have the form of a disc being open in the middle thereof, the outer dimensions thereof being substantially greater than the membrane filter. Such a filter carrier can be mounted quickly and safely advanced and forms a suitable carrier means for the membrane filter, and if the filter carrier is formed with the stated outer dimensions, an edge portion would be available which partly ensures the arrangement of the filter carrier in the advancing conveyor means and partly contributes to shielding during the positioning of the samples at the detectors. According to the invention the membrane filter can also be an integral part of the filter carrier.

Figure 2:
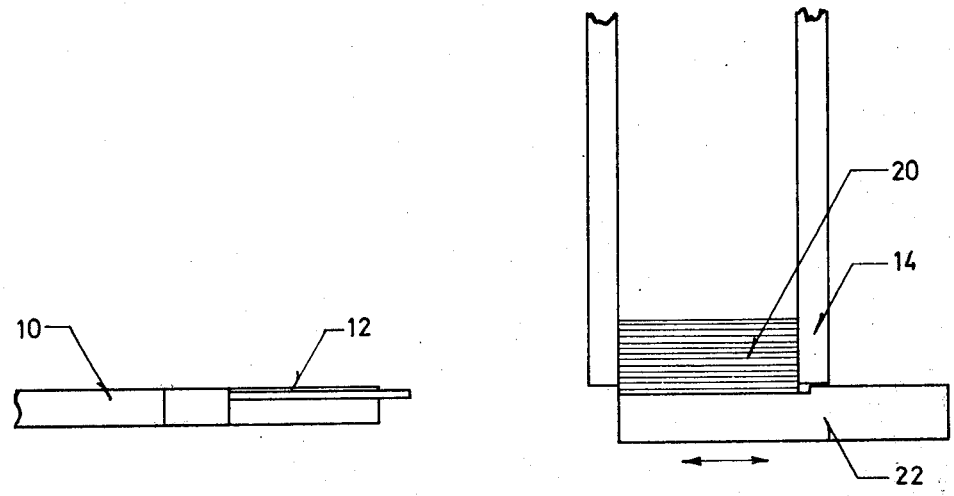

The invention will be explained further with reference to the drawing which shows an embodiment for the apparatus according to the invention, and in which FIG. 1 is a schematic view of the apparatus seen from above, FIG. 2 a filter carrier feeder, FIG. 3 a unit for feeding a membrane filter, FIG. 4 a unit for supplying and isolating a deposit in a liquid sample, FIG. 5 a pair of gamma detectors, FIG. 6 a unit for removing a finished sample, and FIG. 7 a summing and registration apparatus.

The shown embodiment for the apparatus is intended for isolating and measuring the gamma radiation intensity of gamma active deposits contained within a liquid sample which should be used for medical-analytical purposes.

As shown in FIG. 1, the apparatus has a turn table 10 with twelve identical outwards open recesses 12 arranged along the edge thereof and occupying equal angles of arc. In these recesess filter carriers 14 in the form of a disc can be inserted from the outside parallel to the turn table 10, said discs having a plurality of central openings 16. The bottom of each recess 12 has an opening 18 which can be positioned opposite to a vacuum source. The turn table 10 is adapted for stepwise turning over an arc of an angle corresponding to the length of the arc of an angle between the individual recesses 12 In the resting position each recess is thereby positioned by one of the stations A–M.

At station A a filter carrier 14 for a sample is inserted which is to be treated. The filter carriers are supplied one by one from a magazine 20 by means of a slide 22, such as appears schematically from FIG. 2.

Figure 3:
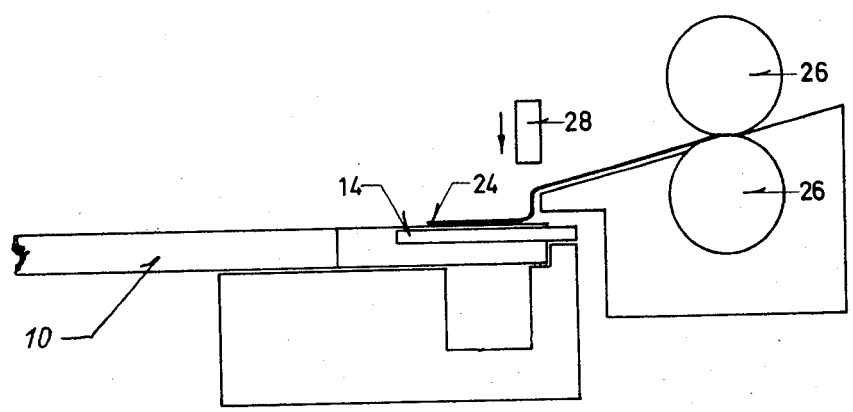

At station C a piece of membrane filter 24 is deposited on the filter carrier 14, vide FIG. 3. The membrane filter material is supplied by means of advancing rollers 26 and cut in suitable lengths by means of a knife 28. From station C to station D the openings 18 of the turn table move over an upwards open channel which is connected with a source for vacuum which through the openings 16 retains the filter material on the filter carrier 14. The cut piece of filter material 24 is smaller than the filter carrier 14.

Figure 4:
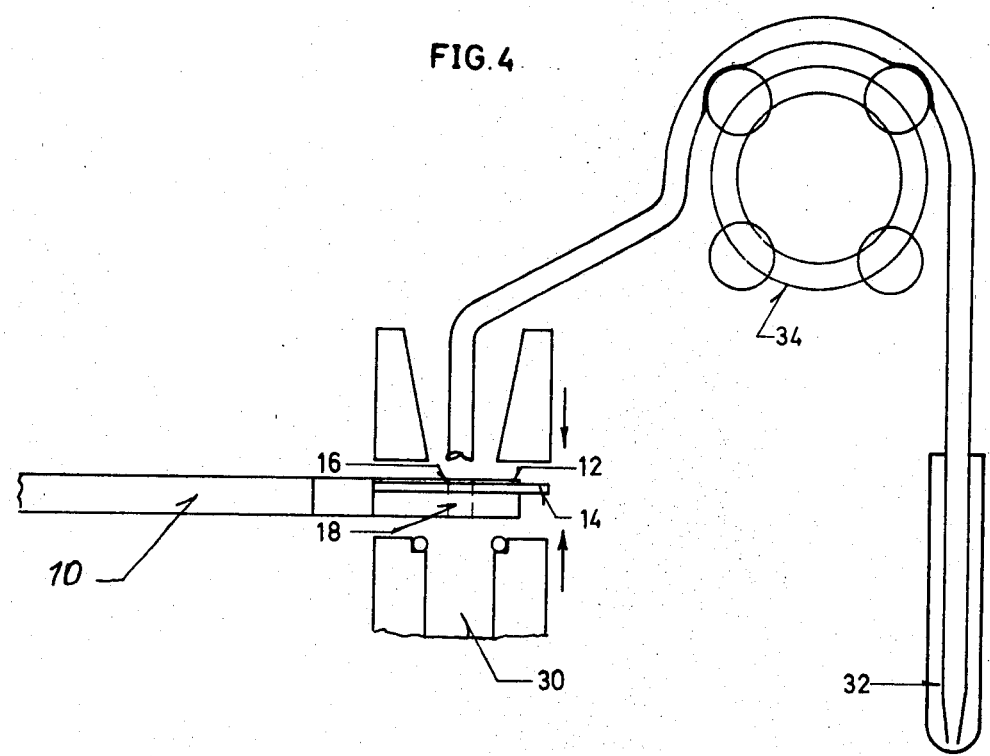
Figure 5:
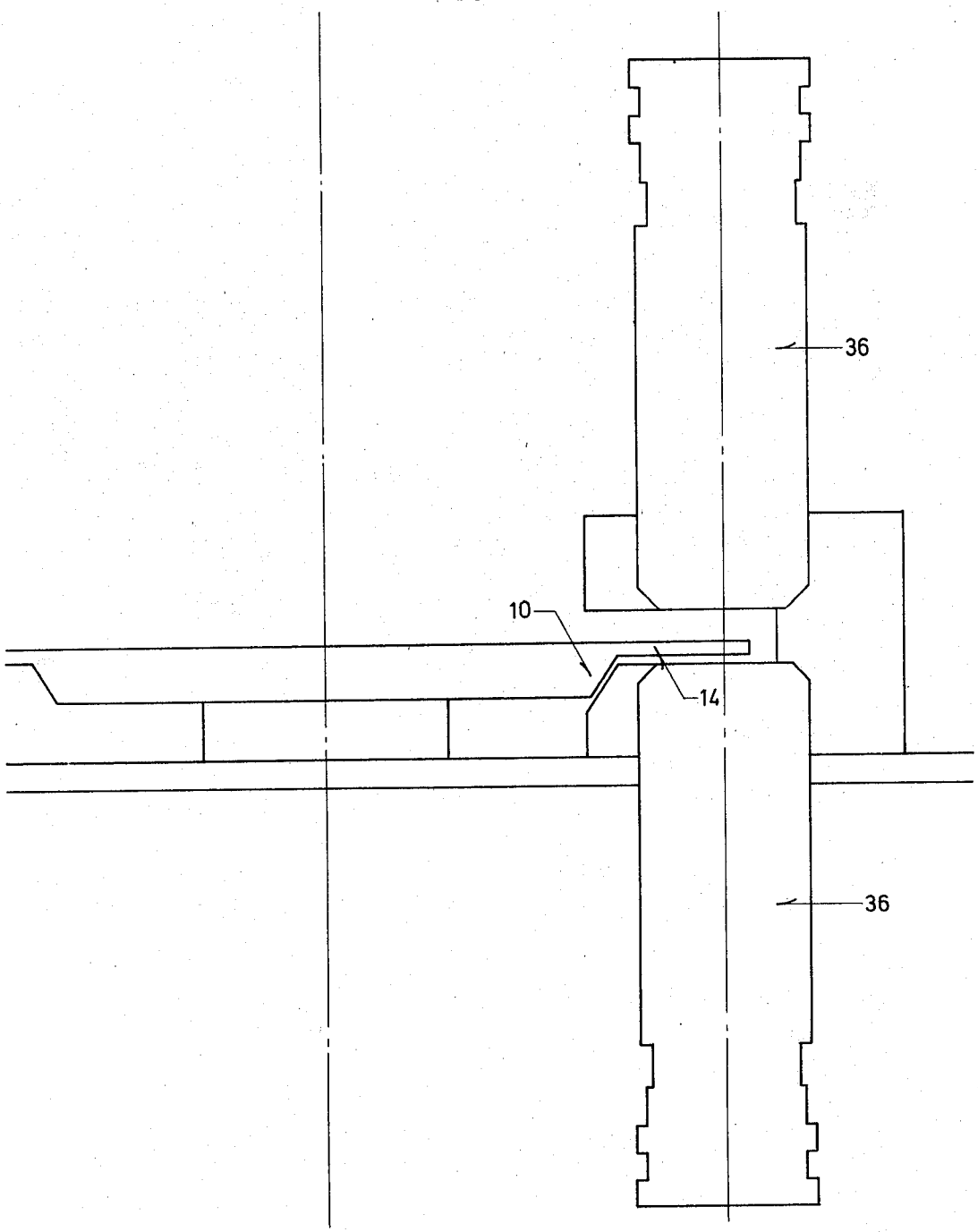

At station E a liquid sample from a liquid glass 32 is supplied to the filter material piece by means of a peristaltic pump 34, vide FIG. 4. The gamma active substances contained in the sample are isolated by filtration as deposits by use of an effective vacuum through a lower channel 30.

The stations F–L constitute the measuring unit of the apparatus. Each station is formed by two oppositely arranged gamma detectors 36, vide FIG. 5. The detectors are connected with the summing and registration apparatus for the measuring results of the detectors shown in FIG. 7. The summing and registration apparatus is adapted to sum the measuring results for each sample which successively passes the stations F–L, and thereafter to register the total measuring result, and the result being e.g. printed or shown on a viewing screen.

Figure 6:
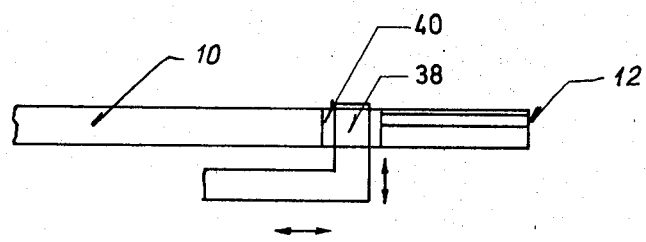

At station M a finger 38 is pushed through a recess 40 in the turn table 10 up behind the filter carrier 14 and pushes this one free from the recess 12, such as appears schematically from FIG. 6. The recess 12 is thereafter prepared to receive a filter carrier for a new sample.

The measurement of the gamma active deposits contained in the liquid samples is thus made with a rate corresponding to the time interval between the stepwise advance of the turn table 10 from station to station. The total measurement constitutes six times the time interval and can thus be very accurate.

In the present example there is a total measurement result from a sample every 20 seconds with a total treatment time per sample of 2 minutes. This means a great measurement accuracy together with a quicker working rhythm.

Figure 7:
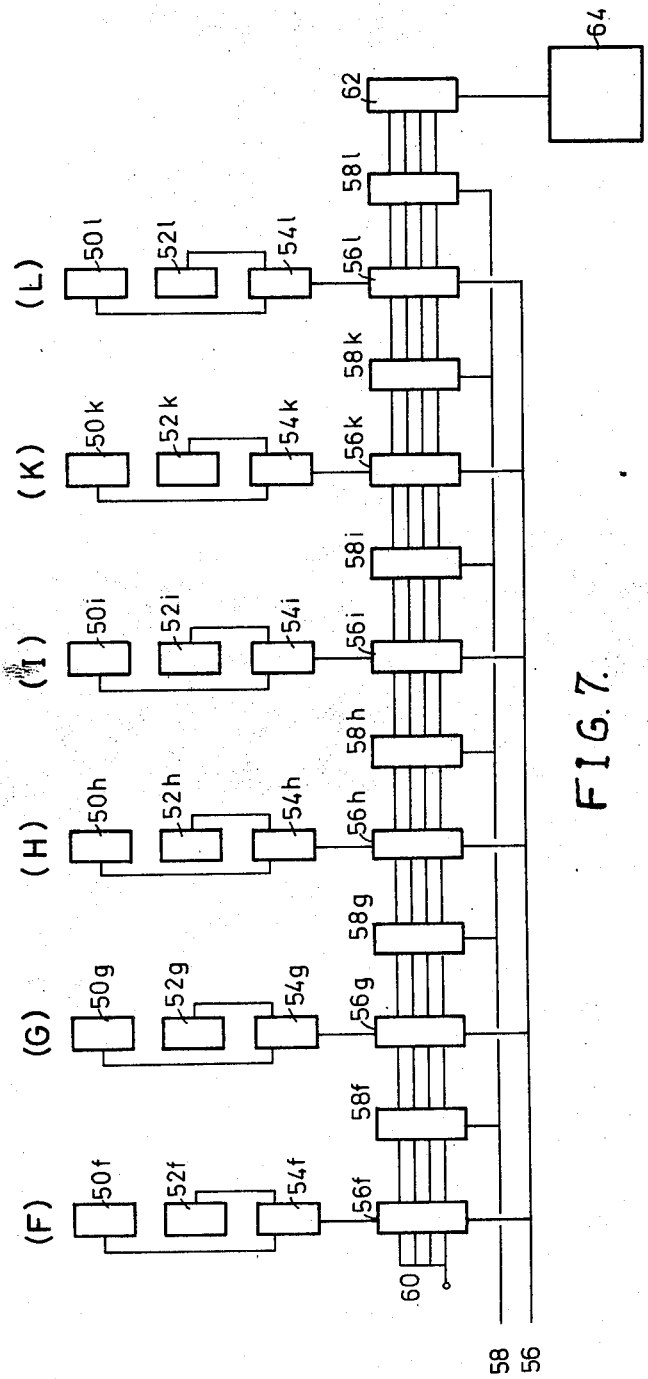

FIG. 7 shows a very schematized embodiment of a summing and registration apparatus which can be used to sum the measuring results of each individual sample, as it passes through the measuring stations F–L. In each measuring station F–L two detectors 50*f* and 52*f* respectively are arranged which are connected to a common analyzer 54*f*. (The small letters behind the reference numerals show in which station the means in question is arranged or to which station it belongs). The counting signals which from the two detectors 50*f* and 52*f* in each station are passed through the analyzer 54*f* of the same station are passed from the analyzer to a counter 56*f* which alternately with succeeding latching circuits 58*f* is arranged in a common bus 60. The counters 56*f* and the latching circuits 58*f* are governed by common governing conduits 56 and 58 respectively in accordance with the advancing movement of the samples through the measuring stations.

At the end of the bus 60 a collecting unit 62 is arranged which sums the signals of the bus 60 coming from the individual stations (counting values) for each individual sample and transfers the result to a registration unit 64 where the results are written out and/or shown.

The applied detectors 50*f* and 52*f* can be of the same kind as previously used by this kind of measurements. The other parts can be of the kind which is usually known within the digital technique, for which reason their structure and equipment is not further described.

The above described isolated and measuring technique can also be applied by other radiation types than gamma radiation.

We claim:

1. Apparatus for measuring the intensity of gamma radiation or other type of radioactive radiation from a radiation active deposit contained within a liquid sample, comprising:

means for isolating said deposit by filtering said liquid sample, means comprising a plurality of radiation detectors each one of which successively performs a partial measurement on said deposit, said isolating means and said radiation detectors being arranged so as to form a process line, means for intermittently and successively advancing a plurality of said deposits step by step along the process line from said isolating means past each radiation detector in turn, each of said partial measurements being performed in the same time interval as subsequent deposits are being isolated by filtering said liquid sample, means for summing up the measuring results from the individual partial measurements on a deposit, and means for registering said sum.

2. The apparatus of claim 1 wherein the advancing means includes a plurality of openings therethrough, said apparatus further comprising means for placing a filter material over each of said openings such that the deposit is collected on said filter material when the sample is filtered by said filter material in said isolating means.

3. The apparatus of claim 1 wherein the advancing means comprises a conveyor, a plurality of filter carriers, means for placing said filter carriers on said conveyor, means for placing a filter material on said filter carrier, and means for removing said filter carrier and filter material from said conveyor.

4. The apparatus of any one of claims 1, 2 or 3 wherein:

said advancing means comprises:

a turntable with a plurality of individual stations disposed at equal angles of arc about the table and means for supporting at each station an individual deposit from said filtering unit, and means for intermittently turning said turntable through the angle of arc between adjacent stations, and said measuring means comprises a plurality of radiation detectors positioned at a plurality of said stations around said turntable such that as said turntable is intermittently turned a deposit is intermittently moved into a radiation measuring relation with each of said radiation detectors.

5. A method for measuring the intensity of gamma radiation or other type of radioactive radiation from a radiation active deposit contained within a liquid sample, comprising the steps of:

isolating said deposit by a step of filtration, measuring said radiation from said deposit in a number of partial steps of measurement, intermittently and successively advancing said deposit step by step along a process line at which said steps of filtration and measurement are performed, each of said partial measurements being performed in the same time interval as subsequent deposits are being isolated by filtering said liquid sample, summing up the measuring results from the individual partial measurements on a deposit, and registering said sum.

6. The method of claim 5 further comprising the steps of:

placing a filter carrier on a conveyor, placing a filter material on said filter carrier, said filter material being used to isolate said deposit, and removing said filter carrier and filter material from said conveyor after the radiation from said deposit is measured.

7. Apparatus for measuring the intensity of gamma radiation or other type of radioactive radiation from a radiation active deposit contained within a liquid sample, comprising:

means for isolating said deposit by filtering said liquid sample, a turntable with a plurality of individual stations disposed at equal angles of arc about the table and means for supporting at each station an individual deposit from said isolating means, means for intermittently turning said turntable through the angle of arc between adjacent stations, a plurality of radiation detectors positioned at a plurality of said stations around said turntable such that as said turntable is intermittently turned a deposit is intermittently moved into a radiation measuring relation with each of said radiation detectors, whereby the radiation from a deposit is measured in a series of partial measurements, each such partial measurement being executed in approximately the same time interval as subsequent deposits are being isolated by filtering said liquid sample, means for summing up the measuring results from the individual partial measurements on a deposit, and means for registering said sum.

8. A method for measuring the intensity of gamma radiation or other type of radioactive radiation from a radiation active deposit contained within a liquid sample, said deposit being located on a turntable having a plurality of individual stations disposed at equal angles of arc about the table and advancing means for intermittently turning said turntable through the angle of arc between adjacent stations, said method comprising the steps of:

isolating said deposit on said turntable by filtering said liquid sample, measuring the radiation from said deposit in a number of partial measurements performed by a plurality of radiation detectors positioned at a plurality of said stations around said turntable, intermittently and successively advancing said deposit from one radiation detector to another by intermittently turning said turntable through the angle of arc between adjacent stations, each of said partial measurements being performed in the same time interval as subsequent deposits are being isolated by filtering said liquid sample, summing up the measuring results from the individual partial measurements on a deposit, and registering said sum.

* * * * *